United States Patent [19]
Pallay, Sr. et al.

[11] Patent Number: 5,349,777
[45] Date of Patent: Sep. 27, 1994

[54] CHUNK DISPENSING RIG

[76] Inventors: Robert V. Pallay, Sr., 157 Waughaw Rd., Towaco, N.J. 07082; Robert V. Pallay, Jr., 17 Sparrow Rd., Randolph, N.J. 07869; Joseph A. Pallay, 210 Split Rock Rd., Rockaway Township, Morris County, N.J. 07005

[21] Appl. No.: 198,770
[22] Filed: Feb. 18, 1994
[51] Int. Cl.$^5$ ............................................. A01K 97/02
[52] U.S. Cl. ................................................. 43/44.99
[58] Field of Search ........................... 43/42.06, 44.99; 119/51.03, 230, 212, 242

[56] References Cited

U.S. PATENT DOCUMENTS

| | | | |
|---|---|---|---|
| 4,017,999 | 4/1977 | Muko | 43/44.99 |
| 4,024,669 | 5/1977 | Fotis | 43/44.99 |
| 5,033,227 | 7/1991 | Coxwell | 43/44.99 |
| 5,131,183 | 7/1992 | Thayer et al. | 43/44.99 |

FOREIGN PATENT DOCUMENTS

| | | | |
|---|---|---|---|
| 993240 | 10/1951 | France | 43/44.99 |
| 866858 | 5/1961 | United Kingdom | 43/44.99 |

*Primary Examiner*—Kurt C. Rowan
*Attorney, Agent, or Firm*—Alfred C. Hill

[57] ABSTRACT

A reusable chunk dispensing rig capable of dispensing chunks at any desired depth in waters being fished comprising an elongated body including a longitudinal axis, a width having a predetermined configuration and a predetermined thickness; a first arrangement coupled to the body to control the descent and ascent of the body in the waters into which the chunks are to be dispensed; a second device having one end thereof closed and secured at a first predetermined location along the width on one side of the body and the other end thereof capable of being opened to receive and dispense the chunks; and an opening disposed at a second predetermined location along the width of the body different than the first location, the opening extending from the one side of the body through the thickness of the body to the other side of the body at a predetermined angle less than 90° with respect to the axis, the opening having the other end of the second device threaded therethrough after the second device receives the chunks, the predetermined angle of the opening and the force of the waters when the body is descending captures the other end of the second device in the opening to maintain the second device closed until the desired depth is reached, and the predetermined angle of the opening and the force of the waters when the body is caused to momentarily ascend at the desired depth causes the other end of the second device to slide from the opening and open up to dispense the chunks at the desired depth.

19 Claims, 2 Drawing Sheets

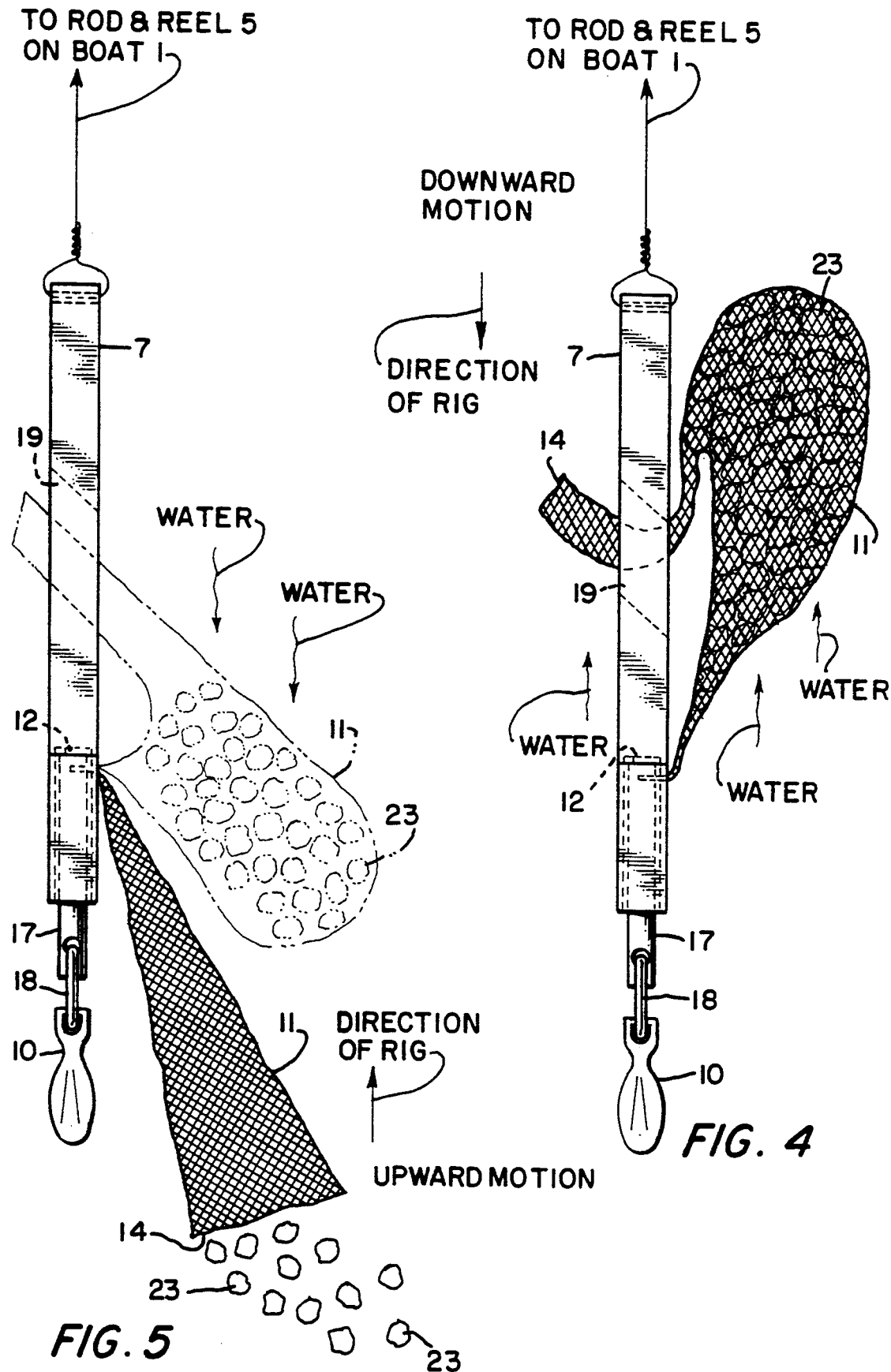

CHUNK DISPENSING RIG

BACKGROUND OF THE INVENTION

The present invention relates generally to fishing lures and more particularly to a reusable chunk dispensing rig. One of the most exciting and popular varieties of sport fishing is any type of bottom fishing in which a number of lines with baited hooks extend from a fishing boat, either as the boat stays in one spot, moves across the open ocean or lake, or drifts with the tide and a lure of some type is placed in proximity to the baited hooks to attract the fish to the hooks.

A variety of lures are available to sport fishermen. Some lures have been designed to attract fish by virtue of arresting and attractive color schemes. Other lures attract fish because, when the lures are drawn behind the boat, the lures undergo an oscillatory pitching or rolling motion.

Other lures are designed to dispense chunks. The practice of chunking involves the dispensing various chunks of bait or to create a feeding frenzy for the fish sought to be caught by the fishermen. If chunks are spread in the water by a chunk dispenser, fish are more likely to be attracted and caught. Chunk fishing is similar to chum fishing, but employs large pieces of bait or small bait fish.

It is desirable to be able to have a chunk dispensing rig that will dispense the chunks or small bait fish at a desired depth in the waters being fished so as to be able to attract fish that normally are near the bottom of the waters to a desired depth near the location of the baited hooks or to attract the fish into this baited hook area that normally reside in shallower waters.

A number of patents have been uncovered that relate to the present invention, but only as the background thereof and not directly anticipatory of the rig of the present invention. None of the prior art lures dispense chunks.

Examples of this prior art can be found in the following U.S. Patents. U.S. Pat. No. 2,765,575 which discloses a porous chum pot which retains the chum within the porous pot such that juices and oils from the chum may flow through the porous pot. U.S. Pat. No. 3,083,492 discloses a sinker having a chum carrying hollow interior. A pull on the sinker will cause a plug closing one end thereof to open so as to release the chum. U.S. Pat. No. 4,024,669 discloses an aerosol can containing bait which is fastened to the anchor line with another line activating the aerosol can to dispense the chum or bait. U.S. Pat. No. 4,550,521 discloses a lure having a cavity for bait that stays in the lure, but can be observed therein by the fish, this lure having a hook arrangement. U.S. Pat. No. 4,709,499 discloses a lure with a chemical containing cartridge for providing fish attractants. U.S. Pat. No. 4,823,497 discloses a lure with a central recess for a chemical light producing tube, a cavity to receive a plurality of balls and a sponge treated with fish attracting scents so as to attract fish by light, noise and odor. U.S. Pat. No. 4,962,609 discloses a lure that has recesses to contain fish attractant substances which is gradually released as the lure is pulled through the water. U.S. Pat. No. 5,054,230 discloses a liquid chum containing vial disposed concentric of the fishing line such that the water pressure squeezes the vial to dispense liquid chum. U.S. Pat. No. 5,097,620 discloses a lure which is attached by a long hollow tubing through which the chum located on board the boat is pushed to the lure and from the lure to the water to attract the fish. U.S. Pat. No. 5,131,183 discloses a shield for bait which can be lowered to a desired depth and upon an upward jerk on the line separates the upper and lower portions of the shield to release bait and hooks that can be contained within the shield. U.S. Pat. No. 5,224,285 discloses a fishing lure having a cavity for bait with the bait staying within the lure, the lure having hooks attached thereto to catch the fish when attract thereto.

All of the prior art lures and/or chum dispensers are relatively complicated and are not really accurately controlled as to the depth at which the chum can be dispensed.

SUMMARY OF THE INVENTION

An object of the present invention is to provide a reusable chunk dispensing rig that is an improvement over the present way of chunking. The present way is to wrap chunks in a paper bag or towel, lower to desired depth, wait for bag to soften, jig up and down until bag breaks.

Another object of the present invention is to provide a reusable chunk dispensing rig that is simple and easily machined.

Still another object of the present invention is to provide a reusable chunk dispensing rig that is an improvement over the prior art rigs with accurate depth control so that the chunks can be dispensed at the desired depth in the waters being fished so as to lure the fish to baited hooks in the vicinity of the chunk dispensing rig of the present invention.

A feature of the present invention is the provision of a reusable chunk dispensing rig capable of dispensing chunks at any desired depth in waters being fished comprising an elongated body including a longitudinal axis, a width having a predetermined configuration and a predetermined thickness; first means coupled to the body to control the descent and ascent of the body in the waters into which the chunks are to be dispensed; second means having one end thereof closed and secured to a first predetermined location along the width on one side of the body and the other end thereof capable of being opened to receive and dispense the chunks; and an opening disposed at a second predetermined location along the width of the body different than the first location, the opening extending from the one side of the body through the thickness of the body to the other side of the body at a predetermined angle less than 90° with respect to the axis, the opening having the other end of the second means threaded therethrough after the second means receives the chunks, the predetermined angle of the opening and the force of the waters when the body is descending captures the other end of the second means in the opening to maintain the second means closed until the desired depth is reached, and the predetermined angle of the opening and the force of the waters when the body is caused to momentarily ascend at the desired depth causes the other end of the second means to slide from the opening and open up to dispense the chunks at the desired depth.

BRIEF DESCRIPTION OF THE DRAWING

Above-mentioned and other features and objects of the present invention will become more apparent by reference to the following description taken in conjunction with the accompanying drawing, in which:

FIGS. 4 and 5 illustrate the operation of the chunk dispensing rig in accordance with the principles of the present invention.

DESCRIPTION OF THE PREFERRED EMBODIMENTS

Figure 1:
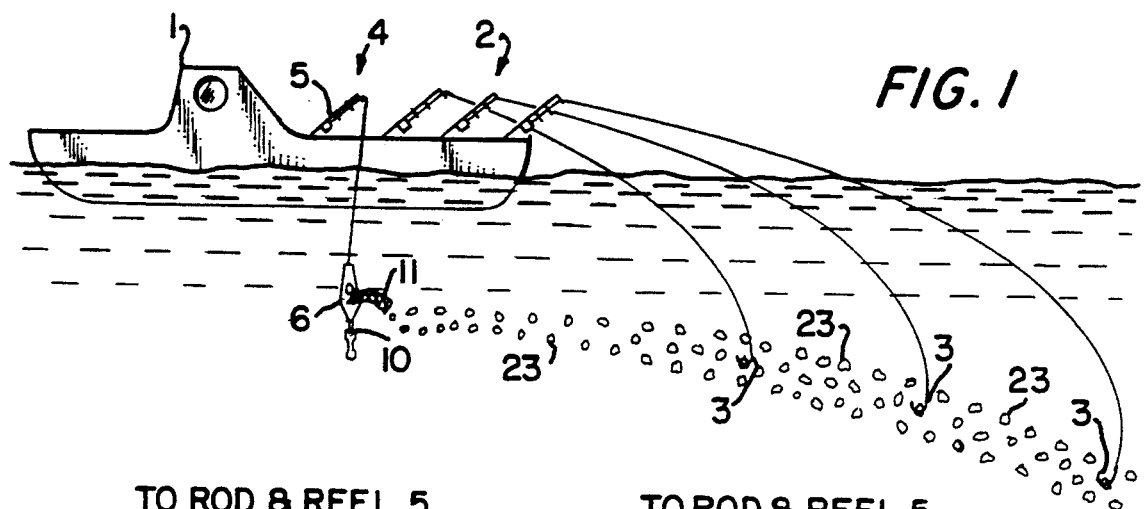
FIG. 1 is an illustration of a fishing boat in waters with a current utilizing the chunk dispensing rig in accordance with the principles of the present application.

Referring to FIG. 1, a fishing boat 1 is illustrated as having a plurality of rods and reels 2 with baited hooks 3 attached to the lines running from rods and reels 2. Fishing boat 1 also includes a reusable chunk dispensing rig 4 in accordance with the principles of the present invention including a rod and reel 5 and the chunk dispensing unit 6. In accordance with the principles of the present invention, the rig 4 can be controlled to release chunks of bait at a desired controlled depth so as to attract the fish being fished for to the baited hooks 3. Rig 4 will enable the chunks to be placed where the baited hooks 3 are, or to help guide the fish to baited hooks 3 from either a greater depth than baited hooks 3, or a depth above baited hooks 3. The rig 4 can be controlled to bring the fish up to the baited hooks 3 by decreasing the release points of the chunks from rig 4 in a step wise fashion. The chunks can be released from rig 4 to cause a feeding frenzy of the fish being attempted to be caught and to localize the location of these fish adjacent baited hooks 3.

Figure 2:
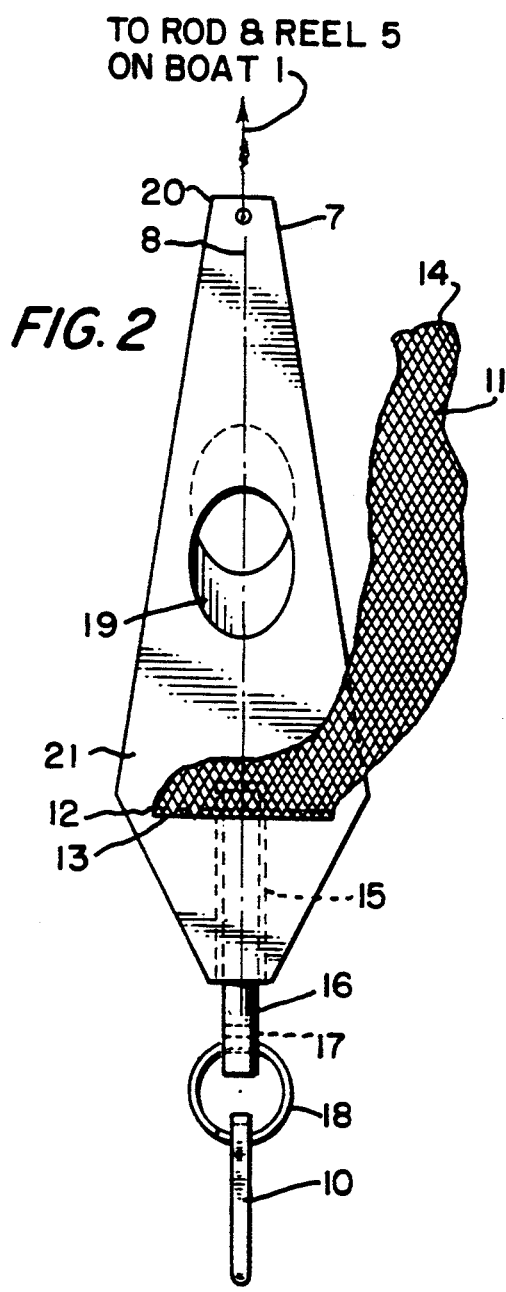
FIG. 2 is a top view of the chunk dispensing rig in accordance with the principles of the present invention.
Figure 3:
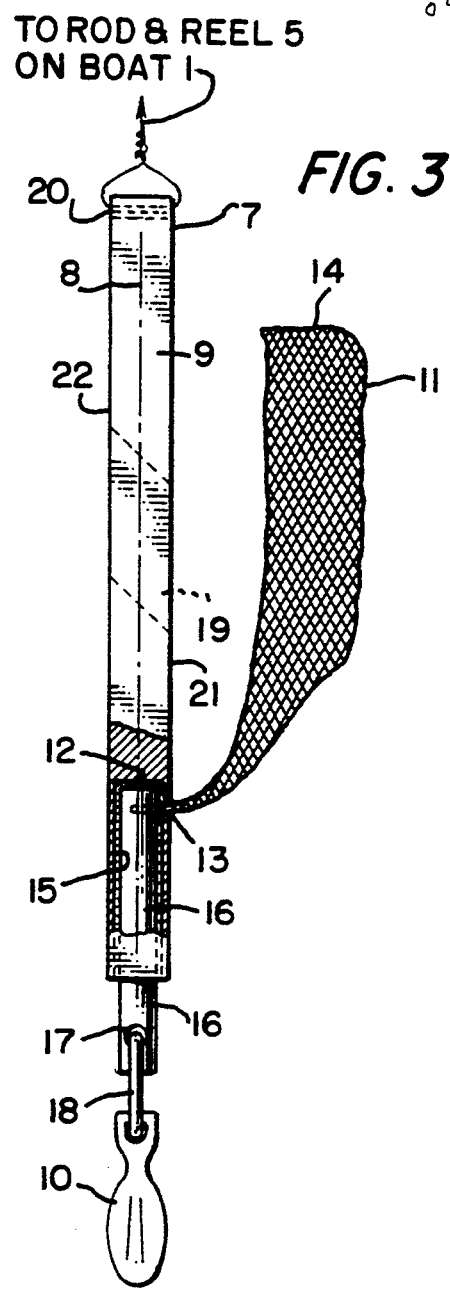
FIG. 3 is a side view of the chunk dispensing rig of FIG. 2.

Referring to FIGS. 2 and 3, the reusable chunk dispensing rig includes an elongated body 7 including a longitudinal axis 8, a width having a predetermined configuration, an example of which is shown in FIG. 2, and a predetermined thickness 9, an example of which is shown in FIG. 3. The predetermined configuration can be any shape or configuration such as a streamlined configuration or a rectangular configuration and the predetermined thickness can be any desired thickness depending upon the turbulence of the waters being fished. If the waters being fished is very turbulent, it would be desirable to have a greater thickness sufficient to withstand the turbulence. If the waters being fished is not turbulent, then the predetermined thickness can be less. A first means including rod and reel 5 on boat 1 and the weighted member 10 control the descent and ascent of body 7 in the waters into which the chunks are to be dispensed. A second means such as mesh bag 11 has one end 12 closed and secured at a first location along the width of side 21 of body 7 in slot 13. The other end 14 of bag 11 can be opened to receive a large amount of chunks and open end 14 also enables the dispensing of a large amount of chunks at the desired depth as controlled by the rod and reel 5 and weighted member 10 in the form of a predetermined weight sinker.

Body 7 has a hole 15 formed in one end of body 7 which contains a pin 16 having an aperture 17 to which the weighted member 10 is secured by a split ring 18. Pin 16 extends into hole 15 to a point adjacent slot 13 so that the closed end 12 of bag 11 is captured in slot 13 when pin 16 is glued or otherwise secured in hole 15.

Body 7 also includes an opening 19 disposed intermediate slot 13 and the end 20 of body 7 attached to the line coming from rod and reel 5. The opening 19 extends from one side 21 of body 7 through the thickness 9 to the other side 22 of body 7 at a predetermined angle less than 90° with respect to the longitudinal axis 8. The predetermined angle of opening 19 is in the range of 35° to 55° and preferably is 45°. As illustrated in FIGS. 2, 3, 4 and 5 the hole 19 extends upward from one side 21 of body 7 to the other side 22 of body 7 at the predetermined angle.

Bag 11 could be made of any durable material, but preferably is made of a durable plastic mesh.

Referring to FIGS. 4 and 5, the operation of the rig of the present invention will now be described. Bag 11 is filled with chunks 23 and the end 14 is threaded through hole 19. The predetermined angle of the opening 19 and the force of the water when body 7 is caused to descend by rod and reel 5 and member 10 captures the end 14 of bag 11 in opening 19 to maintain the bag 14 closed until the desired depth is reached. When the desired depth is reached, the body 7 is caused to momentarily ascend which due to the predetermined angle of opening 19 and the force of the water when the body is caused to momentarily ascend causes the other end 14 of the bag 11 to slide from opening 19 and open up to dispense the chunks at the desired depth as illustrated in FIG. 5.

While we have described above the principles of our invention in connection with specific apparatus, it is to be clearly understood that this description is made only by way of example and not as a limitation to the scope of our invention as set forth in the objects thereof and in the accompanying claims.

We claim:

1. A reusable chunk dispensing rig capable of dispensing chunks at any desired depth in waters being fished comprising:

an elongated body including a longitudinal axis, a width having a predetermined configuration and a predetermined thickness;

first means coupled to said body to control the descent and ascent of said body in said waters into which said chunks are to be dispensed;

second means having one end thereof closed and secured at a first predetermined location along said width on one side of said body and the other end thereof capable of being opened to receive and dispense said chunks; and an opening disposed at a second predetermined location along said width of said body different than said first location, said opening extending from said one side of said body through said thickness of said body to the other side of said body at a predetermined angle less than 90° with respect to said axis, said opening having said other end of said second means threaded therethrough after said second means receives said chunks, said predetermined angle of said opening and the force of said waters when said body is descending captures said other end of said second means in said opening to maintain said second means closed until said desired depth is reached, and said predetermined angle of said opening and the force of said waters when said body is caused to momentarily ascend at said desired depth causes said other end of said second means to slide from said opening and open up to dispense said chunks at said desired depth.

2. A rig according to claim 1, wherein
said first means includes a rod and reel having a line extending from a boat on a surface of said waters and secured to one end of said body, and a member having a given weight secured to the other end of said body.

3. A rig according to claim 2, wherein
said second means includes
a mesh bag made of a predetermined material.

4. A rig according to claim 3, wherein
said one end of said bag is captured in a slot on said one side of said body adjacent said other end of said body, and said opening is disposed intermediate said slot and said one end of said body extending upward from said one side of said body to said other side of said body at said predetermined angle.

5. A rig according to claim 4, wherein
said body further includes
a hole in said other end of said body coaxial of said axis extending to a point within said body adjacent said slot, and a pin disposed and secured in said hole to capture said one end of said bag and to which said member is secured.

6. A rig according to claim 5, wherein
said angle is in the range of 35° to 55°.

7. A rig according to claim 6, wherein
said angle is 45°.

8. A rig according to claim 1, wherein
said second means includes
a mesh bag made of predetermined material.

9. A rig according to claim 8, wherein
said one end of said bag is captured in a slot on said one side of said body at said first location adjacent one end of said body, and said opening extends from said one side of said body away from said one end of said body to said other side of said body at said predetermined angle.

10. A rig according to claim 9, wherein
said body further includes
a hole in said one end of said body coaxial of said axis extending to a point within said body adjacent said slot, and a pin disposed and secured in said hole to capture said one end of said bag and to which a portion of said first means is secured.

11. A rig according to claim 10, wherein
said angle is in the range of 35° to 55°.

12. A rig according to claim 11, wherein
said angle is 45°.

13. A rig according to claim 1, wherein
said second means includes
a plastic mesh bag.

14. A rig according to claim 13, wherein
said one end of said bag is captured in a slot on said one side of said body at said first location adjacent one end of said body, and said opening extends from said one side of said body away from said one end of said body to said other side of said body at said predetermined angle.

15. A rig according to claim 14, wherein
said body further includes
a hole in said one end of said body coaxial of said axis extending to a point within said body adjacent said slot, and a pin disposed and secured in said hole to capture said one end of said bag and to which a portion of said first means is secured.

16. A rig according to claim 15, wherein
said angle is in the range of 35° to 55°.

17. A rig according to claim 16, wherein
said angle is 45°.

18. A rig according to claim 1, wherein
said angle is in the range of 35° to 55°.

19. A rig according to claim 1, wherein
said angle is 45°.

* * * * *